Patented June 20, 1944

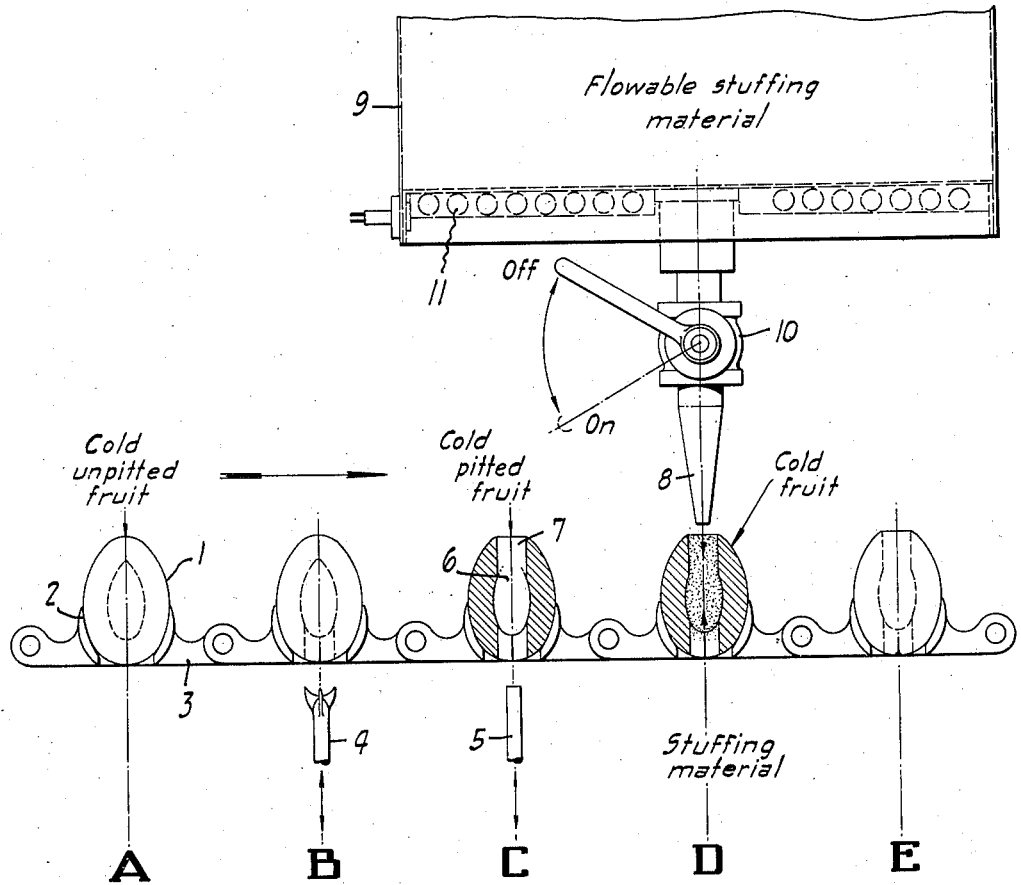

2,351,788

UNITED STATES PATENT OFFICE 2,351,788

METHOD OF STUFFING FRUIT AND PRODUCT

Vernon R. Smith, Lindsay, Calif.

Application March 18, 1941, Serial No. 383,942

15 Claims. (Cl. 99—100)

This invention relates to the method of stuffing fruit and the like, and to the stuffed product, and has for objects, a simple and more efficient method of stuffing fruit than heretofore and which fruit, after stuffing, is substantially unaffected by normal variations in temperature, and keeps well, and is more pleasing in appearance and taste than other stuffed fruit of which I am aware. Another object is an improved method of stuffing olives with pimiento, or another ingredient, or combination of ingredients, in which the stuffing material (whether pimiento or other ingredient) includes a setting agent in the form of a small amount of agar agar, and which stuffing material, at the time of filling the olive, is in substantially liquid or flowable form, and sets to a jelly form in a relatively short time without draining therefrom, and when once set, will not re-liquefy under any normal, or even abnormal rise in atmospheric temperature. Also, the product is stable and furthermore the stuffed product does not need pasteurization, or sterilization to preserve it, and will not support fermentation under ordinary conditions. A still further object is the production of a stuffed fruit product, such as an olive stuffed with pimiento in which the stuffing material contains a single agent that functions in combination with the main body of the material, to act as both a stabilizer and solidifier for the stuffing.

Other objects and advantages will appear in the annexed drawing and specification.

The annexed, single drawing is diagrammatic, and illustrates one manner of handling the fruit, including the steps of my invention.

The following description is specifically directed to the stuffing of cured olives, whether ripe or green, although many of the advantages of the invention are present in the stuffing of other fruits, such, for example, as cherries, dates, or drupes of different kinds and in most all cases where there is a suitable cavity in the fruit or food product for stuffing material.

The most common stuffing used for green or ripe olives is cured pimiento which contains a lactic acid solution. In the commercial form, such as cured, canned pimiento, the pimiento when ground or crushed, without removal of the acid or moisture normally therein, is readily flowable, substantially like a liquid, having generally the flow characteristics and consistency of a product between catsup and tomato juice, but thicker than the latter and less thick than the former. This ground or crushed pimiento, for purposes of this description, will be termed a 100% pimiento product including the lactic acid solution with which it is saturated.

Heretofore, the ordinary method of stuffing olives with pimiento has been to stuff each olive by hand with strips or pieces of the pimiento estimated to be of a size to fill the cavity in each olive. This method is slow, expensive and the resultant olive so stuffed may be only partially filled or over stuffed, since the capacities of the cavities in the olives are not the same. Also, the exposed stuffing at one or both ends of the olive lack uniformity in appearance, many being ragged and unsightly. By my method, these objections and disadvantages are overcome, and new and improved results are also accomplished, as will hereinafter appear, and each olive is neatly and substantially completely filled by use of any suitable liquid dispenser connected to any one of a number of conventional ways with an olive conveyor for automatic filling of each olive at a filling station along the path of travel of the olives. Automatic liquid dispensers so connected with a conveyor for conveying spaced receptacles to be filled with the liquid are familiar to anyone skilled in the art, hence need not be herein shown or described in detail, since such apparatus is not claimed as part of this invention.

In carrying out my method, the olives to be pitted and stuffed may be first pitted in any conventional manner and later cooled, before filling, or the olives, or fruit, 1 (see drawing) with the pit therein, may be positioned in one of the supports 2, of any suitable conveyor 3 for movement along a path of travel in one direction, as indicated by the arrow in the drawing. The support 2 at station A, represents the olive positioning station, and at this point the temperature of the olive so positioned may be from about 20° F. to about 40° F., but preferably the temperature is from 20° F. to about 30° F., or below the freezing point of water.

From station A, the olive is moved along its path of travel to station B, where a conventional cutter 4 slits one end of the olive, the olive pit is then forced out of the olive by a reciprocating pit remover 5, at station C, leaving the pit cavity 6 in the olive with an aperture 7 at its upper end and the slit openings at the lower end. From station C, the olive moves to below the discharge nozzle 8 that is supplied with the liquid-like stuffing from a source of supply 9. A predetermined amount of the stuffing is manually or automatically discharged into each of the cold olives at station D, which is below the nozzle, said amount being sufficient to completely fill the cavity 6 in the olive. Valve 10 or other suitable means may be employed to cause said discharge, and a source of heat, such as an electrical heating element 11 may be associated with the source of supply 9 to keep the stuffing at a temperature above that at which the stuffing will jell, or solidify, which setting temperature is about 95° F. Preferably this temperature of the stuffing at the source of supply is from about 100° F. to about 120° F., so that it is freely flowable from the nozzle when the valve is opened.

Practically immediately after the stuffing has contacted the cold walls of the olive, which latter is at a temperature of about 30° F., it will solidify or jell, and the olive is ready to be packed, when moved to station E. In the event the olive at station D is at a temperature higher than 30° F., but still cold, the time for complete setting may require a number of seconds longer, and the same is true should the stuffing be somewhat warmer than 120° F., but in no instance, within a reasonable range of variation from the stated temperatures, does the stuffing leak or flow out of the slitted lower end of the olive. The initial contact between the stuffing and the cold wall of cavity 6, results in the instantaneous formation of a solidified or jelled seal at the slitted end and the time required for the entire mass of stuffing to fully jell or solidify for safe handling, is hardly longer than the time required to quickly remove the filled or stuffed olive from below the nozzle 8 and to move the next olive into position for stuffing.

The stuffing I may use may be termed a substantially 100% pimiento product, except for the addition of the stabilizing and solidifying agent, which is agar agar in the ratio of from about 2% to about 4%, by weight of the total product, and except for the lactic acid solution as present in the commercially cured pimientos in the canned or packed form. This use of agar agar is highly important, since it is a substantially tasteless and odorless pure organic substance; an emulsoid hydrosol having a pronounced hydrophilic nature, and which liquefies at 212° F., but does not cause the stuffing to set to a gel after melted therein until the temperature of the stuffing falls to about 95° F. Also, agar agar is not attacked by ordinary bacteria, and in the melted state in the presence of the lactic acid solution, as encountered when mixed with the pimiento that is ground or crushed to a readily flowable state, it will cause a setting of the mixture when the temperature of such mixture falls to about 95° F. This property of agar agar to effect a jelling of the stuffing in which the lactic acid solution is present is contrary to the broad statements in chemical literature that agar agar, upon boiling in an acid solution dissolves but will not reset to a substantially solidified material on cooling. In the case of vinegar (acetic acid) and other acids and acid solutions of which I am aware, and in stuffing material including such acids and acid solutions, the agar agar will not reset, after being melted therein, but will set where a lactic acid or lactic acid solution is in the stuffing.

From the foregoing it is seen that I do not require the addition of a gummy substance, such as arrowroot flour, tragacanth, gum arabic or the like, for stabilizing my stuffing material, which substances are undesirable, since readily attacked by bacteria, as is ordinary gelatin in its commercial forms, but instead, the agar agar acts both as a stabilizer and as a solidifying agent, and is not readily attacked by ordinary bacteria as used by me.

While I have given as an example of a stuffing material, the use of cured pimientos, it is not the intention to limit this invention to the use of a pimiento product only, since I have found that a mixture of the pimiento and cheese and other food material and seasoning is satisfactory, provided the acid or acid solution therein, if present, is lactic acid in an amount not exceeding a 30% lactic acid solution. In pimientos the lactic acid solution is well below this percentage.

It will be seen that the particular features of my method, apart from the use of a flowable stuffing material containing a single solidifying and stabilizing agent in the stuffing material, is the cooling of the fruit, whether before or after pitting, to the point where the warm, flowable, stuffing material will congeal, gel, or solidify practically immediately upon the material filling the pit cavity, and in filling the cavity while the fruit is cold. Thus the time for stuffing the olives and for packing the same for shipment is only limited by the momentary time required for injecting the liquid stuffing into the olive and to the speed of an operator in placing the olives in the olive holders. Also, as already explained, the use of olives that are cooled, results in the stuffing material solidifying before any possible leakage from the pit cavity can occur.

The completed product or stuffed olive, produced by my method is seen to be one in which the pit cavity is completely filled, since the stuffing material is readily flowable and reaches all parts of the cavity, and the stuffing will not fall out, dissolve, melt, or ferment under normal handling, packing, or extraordinary conditions of temperature. The final product does not require pasteurization to preserve it, and the full flavor of the pimiento or other stuffing material or combination thereof is preserved, since small percentage of agar agar that is added is tasteless and odorless, and any possible reduction in the strength of the main body of the filling or stuffing is more than compensated for by reason of the greater amount of stuffing in the pit cavity due to its flowable characteristics when injected into said cavity, leaving no pockets or interstices and completely filling the cavity.

It might also be added that the agar agar in pimiento stuffing material, as used by me, cannot be replaced or substituted by ordinary commercial gelatin, since: (1) gelatin does not set quickly enough to prevent draining at the slitted end of the olive, (2) gelatin will melt at ordinary room temperatures, and (3) gelatin is liquified by ordinary bacteria in unsterilized products.

Having described my invention, I claim:

1. The method of stuffing a pitted fruit that comprises the steps of: preparing a heated, flowable, and edible stuffing that includes therein a setting agent adapted to set said stuffing at a predetermined lowering in the temperature thereof; cooling the fruit to be stuffed to a temperature sufficiently lower than the temperature of said stuffing to effect, by heat transfer, a substantially immediate and complete setting of said stuffing, in each fruit, when such fruit is filled therewith; and then filling the pit-cavity in the fruit so cooled, to said latter temperature, with said heated stuffing, to cause said heat transfer, and thereby effect said substantially immediate and complete setting of the stuffing in the fruit.

2. The method of stuffing a pitted fruit that comprises the step of injecting into the pit-cavity of said fruit a predetermined amount of a flowable, edible stuffing capable of solidifying by removal of heat therefrom; the heat capacity of said amount of stuffing being substantially lower, and the temperature thereof being substantially higher, than the heat capacity and temperature of said fruit.

3. The method of stuffing a pitted fruit that includes the steps of; cooling the fruit to be stuffed to a temperature substantially below 95° F.; and then injecting into the pit-cavity of the fruit, so cooled, a flowable, edible stuffing having a setting temperature substantially higher than the temperature of the cooled fruit.

4. The method of stuffing a pitted fruit that includes the steps of; cooling the fruit to be stuffed to about 20° F. to about 30° F.; then filling the pit-cavity of the fruit so cooled with a heated, flowable, edible stuffing having a setting temperature of about 95° F.

5. The method of stuffing a pitted fruit that includes the steps of; cooling the fruit to be stuffed to about the freezing point of water; then filling the pit-cavity of the fruit so cooled with a flowable, edible stuffing the temperature of which is about 100° F. to 120° F., and which stuffing is capable of setting at about 95° F.

6. The method of stuffing a pitted olive that includes the steps of; preparing a flowable, edible stuffing having melted agar agar therein in an amount capable of effecting a setting of the stuffing at a predetermined setting temperature; injecting said stuffing at a temperature above said setting temperature into the pit-cavity in such olive, the temperature of such olive being sufficiently lower than said setting temperature to effect a rapid and complete lowering of the temperature of the stuffing injected into said pit-cavity, to said setting temperature.

7. The method of stuffing a pitted olive that includes the steps of; reducing cured pimiento, together with its lactic acid curing solution, into a flowable mass; adding agar agar to said mass; dissolving said agar agar in said mass by heat and by the action of the lactic acid in said mass; then ejecting the mixture into the pit-cavity of an olive having a temperature below the setting temperature of said mixture, for setting in said olive.

8. The method as defined in claim 7, in which the amount of agar agar so added is about 2% to about 4%, by weight, of said mass, and in which the amount of lactic acid in the mass is about .25% to 1%, by weight, of said mass.

9. The method as defined in claim 7, in which the temperature of the olive at the time of the injection of the agar agar into said pit-cavity, is substantially lower than 95° F., and the setting temperature of said mixture being about 95° F.

10. The method of stuffing a pitted olive that includes the steps of; preparing a flowable, edible stuffing that includes pimiento and lactic acid and a single setting and stabilizing agent; the said agent being in a sufficient amount and of a character to effect a setting of the stuffing at about 95° F.; injecting said stuffing, at a temperature above 95° F. into the pit-cavity of a pitted olive that is of a temperature below 95° F.

11. The method as defined in claim 10, in which said agent is agar agar and is about 2% to 4%, by weight of said stuffing.

12. A food product comprising a pitted, cured olive having the pit-cavity thereof filled with an edible stuffing that includes a mixture of pimiento and a solution of lactic acid, and agar agar in an amount sufficient to maintain said mixture solidified in said pit cavity at atmospheric temperature.

13. A stuffing material for cured, pitted olives substantially the entire amount of which material comprises a mixture of finely crushed pimiento fruit containing a lactic acid curing solution and agar agar and said mixture bearing the characteristics of being highly resistant to infestation and spoilage and of being relatively freely flowable at a temperature substantially above atmospheric temperature and of solidifying at the latter temperature.

14. A stuffing material for cured, pitted olives comprising a mixture of relatively finely crushed, cured pimiento fruit containing a lactic acid curing solution and agar agar; said cured pimiento fruit being the standard cured pimiento of commerce and said lactic acid curing solution being the standard pimiento curing solution of commerce in an amount substantially equal to that adapted to be held by the cured uncrushed pimiento fruit and said agar agar being a relatively small amount of the material by weight and said mixture bearing the characteristics of being highly resistant to infestation and spoilage and of being relatively freely flowable at a temperature substantially above atmospheric temperature and of solidifying at the latter temperature.

15. A stuffing material for cured, pitted olives that comprises a pimiento curing lactic acid solution, finely crushed cured pimiento fruit and agar agar; said lactic acid solution being in an amount adapted to be held by the said crushed pimiento fruit before crushing thereof and being substantially less than a 10% solution, and said agar agar being less than 10% by weight of said mixture, and substantially the entire remainder of the mixture being said crushed pimiento fruit and said mixture bearing the characteristics of being highly resistant to infestation and spoilage and of being relatively freely flowable at a temperature substantially above atmospheric temperature and of solidifying at the latter temperature.

VERNON R. SMITH.